US012560988B2

(12) United States Patent　　　(10) Patent No.:　　US 12,560,988 B2
Ostrovsky　　　　　　　　　　　　(45) Date of Patent:　　　Feb. 24, 2026

(54) APPARATUS AND METHOD FOR DISCOVERING POWER CONNECTIONS USING POWER PATTERNS

(71) Applicant: Extreme Networks, Inc., San Jose, CA (US)

(72) Inventor: Yury Ostrovsky, Toronto (CA)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 18/519,751

(22) Filed: Nov. 27, 2023

(65) Prior Publication Data

US 2025/0172979 A1　　May 29, 2025

(51) Int. Cl.
　　*G06F 1/26*　　　(2006.01)
　　*G06F 1/18*　　　(2006.01)
　　*G06F 1/20*　　　(2006.01)
　　*G06F 11/30*　　(2006.01)
(52) U.S. Cl.
　　CPC ............... *G06F 1/26* (2013.01); *G06F 1/263* (2013.01); *G06F 1/189* (2013.01); *G06F 1/20* (2013.01); *G06F 11/3062* (2013.01)
(58) Field of Classification Search
　　CPC . G06F 1/26; G06F 1/263; G06F 1/189; G06F 11/3062; G06F 1/20
　　USPC ................................................. 713/300, 340
　　See application file for complete search history.

(56) References Cited

U.S. PATENT DOCUMENTS

| | | | |
|---|---|---|---|
| 8,886,985 B2 * | 11/2014 | Somasundaram .. | G06F 11/3051 713/340 |
| 2008/0317021 A1 | 12/2008 | Ives et al. | |
| 2011/0179301 A1 * | 7/2011 | Liu ..................... | H05K 7/1498 713/340 |
| 2012/0017102 A1 | 1/2012 | Turicchi, Jr. et al. | |
| 2014/0115353 A1 | 4/2014 | Hutten et al. | |
| 2017/0085432 A1 | 3/2017 | Zhai et al. | |
| 2022/0300062 A1 * | 9/2022 | Goel ..................... | G06F 1/329 |

OTHER PUBLICATIONS

International Search Report and Written Opinion of the International Searching Authority directed to International Patent Application No. PCT/US2024/048811, mailed Dec. 10, 2024; 16 pages.

* cited by examiner

*Primary Examiner* — Ji H Bae

(57)　　　　　　　ABSTRACT

Some aspects of this disclosure relate to system and methods for discovering a power connection between a power supply device and a network device. An application server transmits a message to a first network device to cause the first network device to consume power according to pattern information and timing information of the message. The application server receives power usage data of network work devices from power supply devices and compares the power usage data with pattern data defined by the pattern information and the timing information, and identifies usage data that matches the pattern data. The application server further identifies a power supply device connecting to the first network device based on the usage data that matches the pattern data.

20 Claims, 10 Drawing Sheets

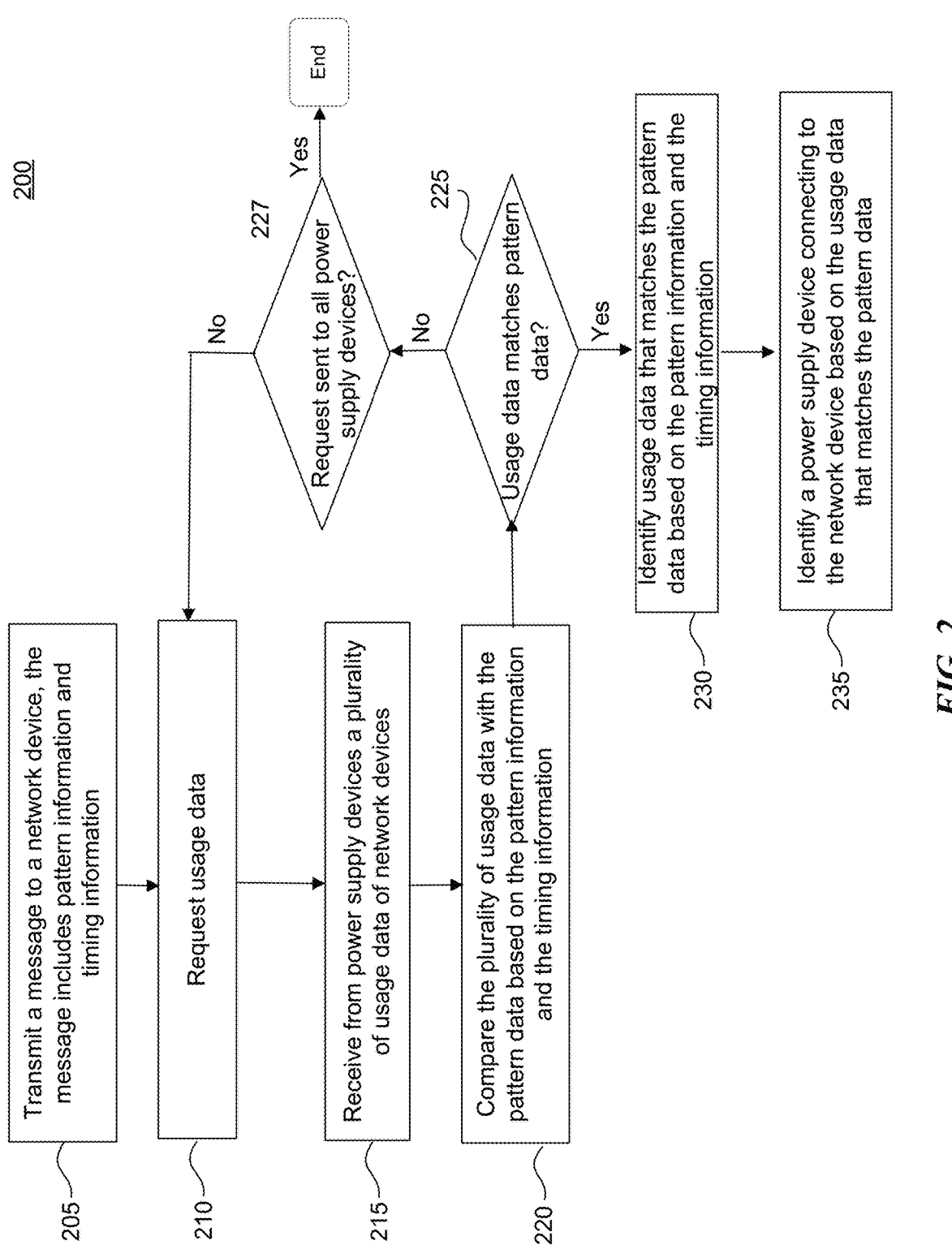

200

Transmit a message to a network device, the message includes pattern information and timing information — 205

Request usage data — 210

Receive from power supply devices a plurality of usage data of network devices — 215

Compare the plurality of usage data with the pattern data based on the pattern information and the timing information — 220

Usage data matches pattern data? — 225

Request sent to all power supply devices? — 227

No → End (Yes)

Identify usage data that matches the pattern data based on the pattern information and the timing information — 230

Identify a power supply device connecting to the network device based on the usage data that matches the pattern data — 235

Receive a message including pattern information and timing information

Perform actions based on the pattern information and the timing information

305

310

300B

325 Receive request for usage data

330 Transmit usage data

300C

Identify a subset of data points from the usage data based on timing information Compare the identified set of data points with pattern data

345

350

400

405 A network device is rebooted

410 A power supply device is reconnected

415 A network device is added to the system

420 A user input

APPARATUS AND METHOD FOR DISCOVERING POWER CONNECTIONS USING POWER PATTERNS

BACKGROUND

Field

The described aspects generally relate to mechanisms for discovering power connections between network devices and power supply devices in computer networking systems.

Background

Network devices such as servers, workstations, routers, switches, hubs, network storage units, modems, etc., are essential to provide continuous connectivity to users, enable business continuity and productivity. However, network devices are vulnerable to power disruptions, such as outages, surges, and spikes, which can damage the hardware, corrupt the data, or cause interruption to business, works and/or services. Therefore, it is important to protect network devices from power disruptions. Power supply devices such as uninterruptible power supply (UPS) devices, and power distribution units (PDUs) are widely used to provide backup power and surge protection in case of a power failure or fluctuation. However, a power supply device does not exchange data with network devices connected to the power supply device. In order to track power connections between network devices and power supply devices, users manually maintain a spreadsheet or a database of the power connections. With increasing number of network devices deployed and connected to power supply devices in the field, it is hard to update and track power connections between the network devices and the power supply devices manually. Accordingly, there is a need to have an improved mechanism to automatically manage the power connections between the network devices and power supply devices.

SUMMARY

Improved mechanisms of automatically discovering and managing power connections between network devices and power supply devices are provided.

Some aspects of this disclosure relate to a computer-implemented method. The method transmits a message to a first network device. The message includes pattern information and timing information, and the message causes the first network device to consume power according to the pattern information and the timing information. After receiving a plurality of usage data from one or more power supply devices, the method compares the plurality of usage data with pattern data defined by the pattern information and the timing information and identifies usage data that matches the pattern data. Each of the plurality of usage data corresponds to a network device.

In some aspects, the method further includes identifying a power supply device connected to the first network device based on the usage data that matches the pattern data.

In some aspects, transmitting the message is triggered by a triggering event, and the triggering event is the first network device having been rebooted, the first network device reconnecting to a power supply device, or a user input.

In some aspects, the pattern information includes a pattern of fan speed values of a fan of the first network device.

In some aspects, the timing information includes a start time and a duration of time.

In some aspects, comparing the plurality of usage data with the pattern data is based on the timing information.

In some aspects, each of the plurality of power consumption data includes values overtime of at least one of current, power, or load associated with a corresponding port of one of the one or more power supply devices.

Some aspects of this disclosure relate to a non-transitory computer-readable medium having instructions stored thereon that, when executed by at least one computing processor, cause the at least one computing processor to perform operations of transmitting a message to a first network device. The message includes pattern information and timing information, and the message causes the first network device to consume power according to the pattern information and the timing information. The operations further include receiving a plurality of usage data from one or more power supply devices, and each of the plurality of usage data corresponds to a network device. The operations further include comparing the plurality of usage data with pattern data defined by the pattern information and the timing information. The operations further include identifying usage data that matches the pattern data. The operations further include identifying a power supply device connecting to the first network device based on the usage data that matches the pattern data.

In some aspects, the operation of transmitting the message is triggered by a triggering event, and the triggering event is one of the first network device having been rebooted, the first network device reconnecting to a power supply device, or a user input.

In some aspects, the pattern information of the message includes a pattern of fan speed values of a fan of the first network device and the timing information of the message includes a start time and a duration of time. Each of the plurality of usage data includes values overtime of at least one of current, power, or load associated with a corresponding port of one of the one or more power supply devices.

Some aspects of this disclosure relate to a system. The system includes a memory and a processor coupled to the memory. The processor can be configured to transmit a message to a first network device. The message includes pattern information and timing information, and the message causes the first network device to consume power according to the pattern information and the timing information. The processor is further configured to receive a plurality of usage data from one or more power supply devices, compare the plurality of usage data with pattern data defined by the pattern information and the timing information, and identify usage data that matches the pattern data. Each of the plurality of usage data corresponds to a network device. The processor is further configured to be triggered by a triggering event to transmit the message. The triggering event is one of the first network device having been rebooted, the first network device reconnecting to a power supply device, or a user input.

This summary is provided for purposes of illustrating some aspects of the disclosure to provide an understanding of the subject matter described herein. Accordingly, the above-described features are examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 2 illustrates an example method of discovering power connections between network devices and power supply devices, according to some aspects of the disclosure.

Figure 1:
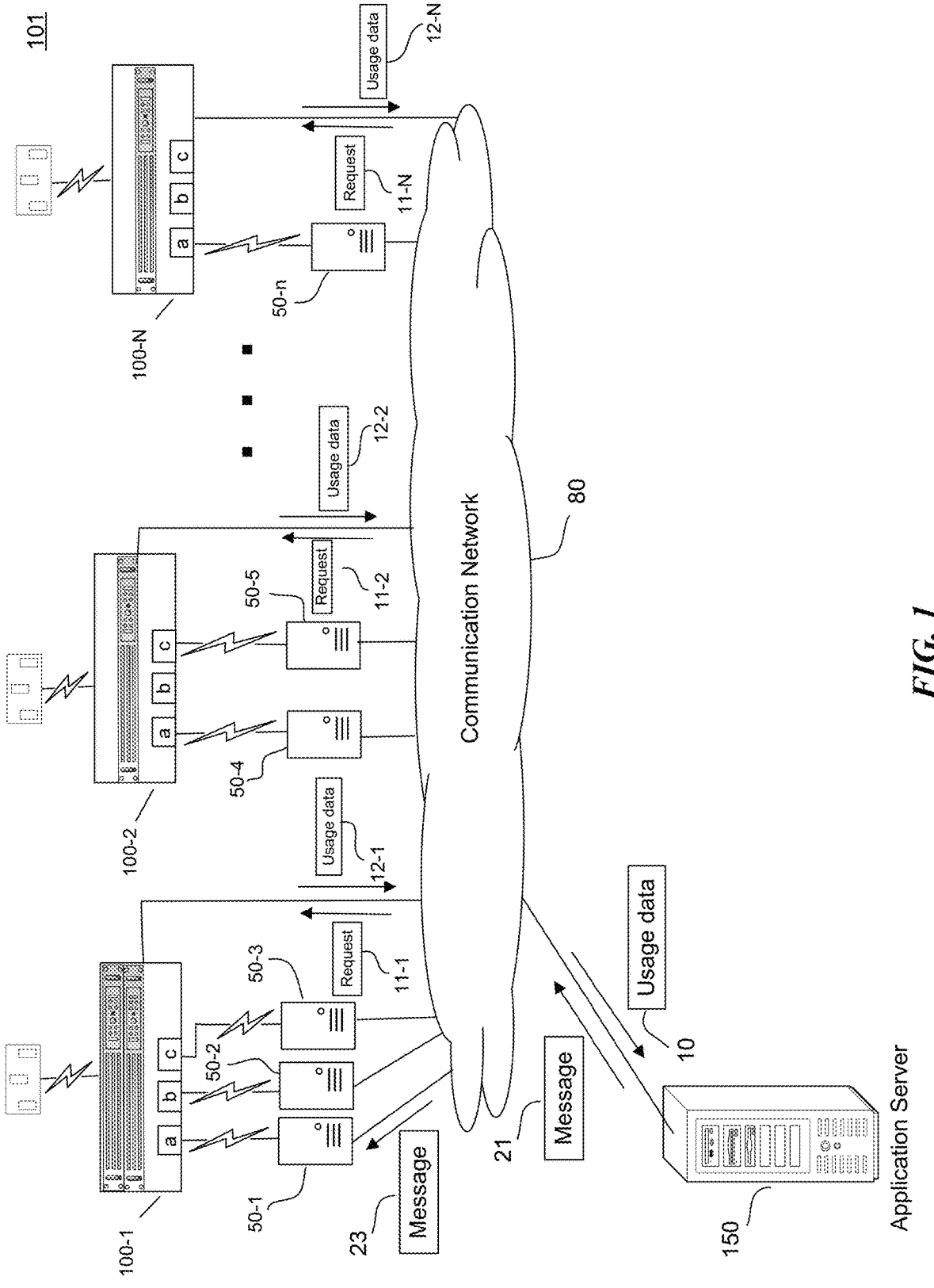
FIG. 1 illustrates an example system in which power connections between network devices and power supply devices are obtained, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

FIG. 1 illustrates an example system 101 according to some aspects of the disclosure. In some aspects, the example system 101 includes one or more network devices 50-1 to 50-$n$ connected to one or more power supply devices 100-1 to 100-N, where n and N are positive integer numbers. Throughout the disclosure, a network device connects to a power supply device means that the network device may draw power from the power supply device. From here on, network devices 50-1, . . . , 50-$n$ are either referred to as a group as network devices 50 or individually as network device 50-1, 50-2, . . . , 50-$n$. Similarly, power supply devices 100-1, 100-2, . . . , 100-N are referred to either as a group as power supply devices 100 or individually as power supply device 100-1-1, 100-2, . . . , 100-N.

According to some aspects, each of the power supply devices 100 connects to the power grid through AC outlets or by other means. Each of the power supply devices 100 may include one or more UPS modules and/or one or more of PDU modules. The one or more UPS modules may be connected to each other in parallel to provide additional redundancy in supplying power. The one or more PDU modules may be connected to each other in parallel to provide additional redundancy in supplying power. Each of the power supply devices 100 may also include a power distribution module (PDM). The power supply devices 100 may have their own batteries to provide power supply to network devices in case of power disruption, for example, during a power loss event. The power supply devices 100 may be smart devices and they may interconnect to other devices through a communication network 80. Each of the power supply devices 100 may provide power connections, or provide electrical power to one or more network devices 50. Each of the power supply devices 100 may have one or more ports and each of the network devices 50 may connect to one or more of the ports of the power supply device. Additionally, or alternatively, each network device 50 can be connected to two or more power supply devices 100. For example, network device 50-1 can be connected to (e.g., draw power from) power supply devices 100-1 and 100-2 (not show). Additionally, or alternatively, each network device 50 can be connected to two or more ports of two or more power supply devices 100. It is to be appreciated that while in FIG. 1, power supply devices 100-1, 100-2 and 100-N are illustrated with three ports each, namely port a, port b, and port c, each of the power supply devices 100 may have more or less than 3 ports.

According to some aspects, network devices 50 can be any component or device in a networking environment, which may include but are not limit to servers, workstations, routers, switches, hubs, network storage units, modems, or the like. Each of the network devices 50 may connect to one or more of the power supply devices 100. Each of the network devices 50 may also communicate with each other through communication network 80. In one example, during normal operations, network devices 50 receive power from the power grid through power supply devices 100, in the event of power disruption, one or more network devices 50 may receive power from the batteries of one or more power supply devices 100 temporary.

According to some aspects, the exemplary system 101 also includes application server 150. The application server 150 may include a management application that can communicate with network devices 50 and power supply devices 100 through communication network 80. Application server 150 may control power consumption patterns of one or more network devices 50 through control messages 21. For example, the management application may be installed on application server 150 and cause the application server 150 to transmit control messages 21. From here on, application server 150 also refers to management applications installed on application server 150. A control message 21 may include pattern information and timing information that may cause a network device to consume power according to the pattern information and the timing information. In one example, control message 21 controls power consumption of the network device by controlling the activity of one of the components the network device. Control message 21 may include a data field identifying the component of the network device it is controlling. In one example, control message 21 identifies a fan of the network device in the data field and controls the fan speed of the network device, as a result, control message 21 controls the power consumption of the network device. It is to be appreciated that fans in a network device can be used for cooling. For example, each network device can include one or more fans that can be used to cool the network device. The network device can include other mechanisms for cooling the network device. Control message 21 can be used to control one or more parameters of the other cooling mechanisms that can affect the power consumption of the network device. It is to be appreciated that control message 21 may also be used to control other components of the network device that may consume significant enough power so the power consumption variations of the network device may be observed. One example of such components can be displays.

In one aspect, the pattern information includes a set of pattern data points $P=(P_1, P_2, \ldots . P_m)$, and each data point $P_i$ of the set of data points represents a point on a 2-dimensional plane defined by a Time-axis and a Value-axis, for example, $P_i=(T_i, V_i)$. Here m is a positive integer number, i is an index that takes value between 1 and m, $T_i$ represents a time parameter on the Time-axis, and $V_i$ represents a value parameter on the Value-axis, which may represent a fan speed. The timing information may include a start time $T_0$, a pattern duration T and a repetition value R. Here $T_0$, T, and R are positive integers. Time parameter $T_i$ may take values starting at the start time $T_0$ and for the pattern duration T on the Time-axis. The pattern information defines a pattern in the pattern duration T, and the pattern may be repeated R times. The value of $T_1$ of the first pattern data point $P_i$ may take the same value as $T_0$. It is to be appreciated that $T_1$ may take a different value as $T_0$. Message 21 may cause the fan of the network device to change speed according to the pattern information and the timing information. For example, the fan speed of the network device may be kept at speed $V_i$ between time $T_i$ and $T_{i+1}$ as defined by the set of data points P. The power consumption of the network device may vary accordingly. It is to be appreciated that pattern data points P may be in a different data format. It is also to be appreciated that other means may be used to control the power consumption of the network device, for example, by varying the computational load of a microchip of the network device to vary the power consumption of the network device, turning on and off a display of the network device, changing some elements of the display of the network device.

When message 21 is transmitted through communication network 80, it may turn into message 23. It is to be appreciated that message 23 may or may not be the same as message 21. However, message 23 may also include the pattern information and the timing information. In one example, control message 23 is received by network device 50-1, and control message 23 causes network device 50-1 to consume power according to the pattern information and the timing information of control message 23. While the example system 101 in FIG. 1 illustrates that message 23 is transmitted to network device 50-1, it is to be appreciated that application server 150 may transmit one or more control messages 21 to one or more network devices 50, accordingly, each of the one or more network devices 50 may receive a control message 23. In one aspect, application server 150 sends different messages 21 to different network devices 50 at different time. In one aspect, application server 150 sends different messages 21 to different network devices 50 at the same time.

According to some aspects, each of the power supply devices 100 may record usage data of all of its ports and store them locally. One or more power supply devices 100 may receive requests 11 for power usage data of network devices connecting to the one or more power supply devices 100. While a power supply device may not know the identities of network devices connecting to the power supply device, the power supply device may provide usage data 12 to application server 150 with respect to each of its port. In one aspect, usage data 12 includes a set of usage data points represented by a time parameter and a value parameter on a 2-dimensional plane defined by a Time-axis and a Value-axis. Value parameter of the usage data points of usage data 12 may be one or more of input/output current (Amp), power consumption (Wt), load (%), etc. It is to be appreciated that other forms of data may be used in usage data 12.

In one aspect, power supply device 100-1 receives a request 11-1 from application server 150, and transmits usage data 12-1 to application server 150 through communication network 80. Usage data 12-1 may be power consumption data of each of the network devices connected to power supply device 100-1, e.g., network devices 50-1, 50-2, and 50-3. While power supply device 100-1 may not be able to identify the identities of network devices connected to its ports, power supply device 100-1 can provide power consumption data of each of its ports, e.g., ports a, b, and c. Usage data 12-1 may include a data field to identify a particular port usage data 12-1 is representing. Usage data 12-1 may also include an identification data field to identify the power supply device 100-1. The identification of the power supply device 100-1 could be an Internet Protocol (IP) address. It is to be appreciated that other forms of identification that can uniquely identify the power supply device 100-1 may be used. Similarly, power supply device 100-2 may receive a request 11-2 and provide usage data 12-2 of its port a and port b to application server 150 though communication network 80, and power supply device 100-N may receive a request 11-N and provide usage data 12-N of its port a to application server 150 though communication network 80. Application server 150 may receive usage data 10 from power supply devices. Usage data 10 may be in the form of input/output current over a period of time, or power consumption in Wt over a period of time, or load in percentage over a period of time. Each usage data 10 may include data fields to identify both a particular power supply device and a port number of the power supply device.

From here on, requests 11-1, . . . , 11-N are either referred to as a group as requests 11 or individually as request 11-1, 11-2, . . . , 11-N. Similarly, usage data 12-1, 12-2, . . . , 12-N are referred to either as a group as usage data 12 or individually as usage data 12-1-1, 12-2, . . . , 12-N. When usage data 12 are transmitted through communication network 80 and arrives at application server 150, it may turn into usage data 10. It is to be appreciated that usage data 10 may or may not be the same as one of usage data 12. However, usage data 10 may include the data content of one of usage data 12, and usage data 10 may also include identification data fields for identifying the power supply device and a port of the power supply device.

It is to be appreciated that not all power supply devices 100 may receive request messages 11. In one example, application server 150 sends requests for usage data to a subset of power supply devices 100, and sends requests for usage to a different subset of power supply devices 100 at a different time. It is also to be appreciated that application server 150 may not send request messages 11 to power supply devices 100 at all. Power supply devices 100 may voluntarily transmit usage data 12 to application server 150 in real time, or periodically.

According to some aspects, communication network 80 may be wired or wireless communication networks or a combination of both wired and wireless communication networks. Communication network 80 may include IP based networks, such as the Internet. Communication network 80 may be part of public and/or private networks and it may include an intranet, a local area network (LAN), a wide area network (WAN), or one or more access networks, such as, for example, Radio Access Networks (RANs) of one or more wireless communication systems. Wireless communication systems may include systems standardized by the 3rd Generation Partnership Project (3GPP) or by the Institute of Electrical and Electronics Engineers (IEEE), such as, for example, Long Term Evolution (LTE), LTE-Advance (LTE-A), fifth generation (5G) New Radio, or IEEE 802.11. Wireless communication systems may also include satellite based networks.

FIG. 2 illustrates a block diagram of method 200, according to some aspects of the disclosure. For example, method 200 may be performed by an application server. As a convenience and not a limitation, FIG. 2 may be described with regard to elements of FIG. 1.

Method 200 may represent the operation of a management application installed on an application server, (for example, application server 150 of FIG. 1). Method 200 may also be performed by computer system 700 of FIG. 7. But method 200 is not limited to the specific aspects depicted in those figures and other systems may be used to perform the method as will be understood by those skilled in the art. It is to be appreciated that not all operations may be needed, or additional operations may be needed, and the operations may not be performed in the same order as shown in FIG. 2.

At 205, the application server transmits a control message (for example, message 21 of FIG. 1) to a network device, (for example, one of the network devices 50 of FIG. 1). The same message or a slightly different message (for example, message 23 of FIG. 1) is received by one of the network devices after traveling through a communication network (for example, communication network 80 of FIG. 1). The message may include pattern information and timing information. The pattern information together with the timing information define a pattern over a period of time the network device receives, which may cause the network device to have a power consumption pattern similar to the received pattern over the period of time. In one example, the message identifies a component of the network device, such as one or more fans of the network device and the pattern information defines a fan speed variation pattern. The pattern information may define that the fan speed reaches 100% of the full speed for 10 seconds and reduces to 10% of the full speed for the next 10 seconds.

The timing information may define a starting time that the pattern starts, the pattern duration time, and times the pattern is repeated. As described earlier with respect to FIG. 1, the pattern information may be defined by a set of data points $P=(P_1, P_2, \ldots . P_m)$, each data point $P_i=(T_i, V_i)$ may be defined by a time parameter $T_i$ and a value parameter $V_i$. Here m is a positive integer and index i takes value between 1 and m. The network device's power consumption over a period of time may be similar to the fan speed pattern as defined by the pattern information and the timing information of the control message. In one aspect, the control message identifies a computational task to be executed by a microprocessor of the network device, such as a central processing unit (CPU). The pattern information may define the variation of the computation load of the CPU over time and accordingly the network device may have a power consumption pattern similar to the pattern as defined by the pattern information and the timing information of the control message. It is to be appreciated that other means may be used to vary the power consumption pattern of the network device.

At 210, the application server sends one or more requests for usage data (for example, requests 11 of FIG. 1) to power supply devices (for example, power supply devices 100 of FIG. 1). The application server may send requests for usage data after it has send the control message (for example, message 21, 23 of FIG. 1) to one or more network devices (for example, network devices 50 of FIG. 1) to control their power consumption patterns for a period of time. The requests may include timing information including a start time and a time period (e.g., data duration) during which time the usage data is being requested. The start time and the data duration may be based on the timing information included in the control message. In one example, the start time of usage data in the request is the same or earlier than the start time in the timing information of the control message, and the data duration in the request may be equal or larger than the total duration of the repeating patterns defined by the pattern information and the timing information of the control message. In one aspect, the application server sends requests for usage data to all power supply devices. In one aspect, the application server sends requests for usage data to a subset of power supply devices to reduce network congestion. The application server then sends requests for usage data to a different subset of power supply devices at a different time if a match between the usage data and pattern data is not found, which will be described in greater details later. It is to be appreciated that the power supply devices may voluntarily send usage data in real time or periodically, in this case, the application server may not need to send the requests for usage data to power supply devices.

At 215, the application server may receive usage data (for example, usage data 12, 10 of FIG. 1) from one or more power supply devices. The usage data may be power consumption data over a period of time for a network devices that connects to a port of a power supply device. The usage data may include an identification to identify the power supply device. The identification can be an IP address of the power supply device. It is to be appreciated that other forms of identification that can uniquely identify the power supply device may be used. The usage data may also include a data field to identify the port of the power supply device. In one aspect, the usage data includes a set of usage data points represented by a time parameter and a value parameters on a 2-dimensional plane defined by a Time-axis and a Value-axis. Value parameter of the usage data may be in the form of input/output current (Amp), power consumption (Wt), load (%), etc. In one aspect, the usage data include a set of data points representing instantaneous input/output current in Amp at discrete times on the Time-axis over a period of time. In one aspect, the usage data include a set of data points representing instantaneous power consumption in Wt at discrete times on the Time-axis over a period of time. In one aspect, the usage data include a set of data points representing instantaneous load in percent at discrete times on the Time-axis over a period of time. The period of time may be sampled at every 1 s to produce the discrete times on the Time-axis. It is to be appreciated that other sample period may be used to produce the set of usage data points.

At 220, the application server compares the received usage data from one or more power supply devices with the pattern data defined by the pattern information and the timing information included in the control message. It is to be appreciated that a power supply device may provide multiple usage data each corresponds to one of the ports of the power supply device. The usage data may be represented by a set of data points on a 2-dimensional plane defined by a Time-axis and a Value-axis, each usage data point is presented by a Time parameter and a Value parameter. As has been discussed earlier with respect to FIG. 1, the pattern information and the timing information may define a set of pattern data points on a 2-dimensional plane defined by a Time-axis and a Value-axis. The Value-axis may represent a fan speed value and the pattern data points may represent a fan speed variation pattern over a period of time. The pattern may be repeated multiple times according to the timing information of the control message. The set of usage data points may be further down-sampled or interpolated to obtain a subset of usage data points. The subset of usage data points are obtained to be align with the pattern data point in the Time-axis. The subset of usage data points may be compared to the pattern data points. In one aspect, graphical presentations of the subset of usage data points and the pattern data points are obtained over the 2-dimensional plane and two graphs are compared. The process of comparing the usage data of a power supply device with the pattern data based on the pattern information and the timing information of the control message is further illustrated in a block diagram in FIG. 3C and in FIG. 6C.

At 225, the application server makes a determination if there is a match between the usage data and the pattern data based on the comparison at 220. There may be a match if similarity between the usage data and the pattern data is found based on the comparison. Similarity may be based on the graphs of the usage data points and the pattern data points on the 2-dimensional plane. According to some aspects, the match is determined if a difference between the usage data and the pattern data is less than a threshold, where the usage data and the pattern data may be normalized. It is to be appreciated that other method of finding similarity may be used. If a match is not found, method 200 continues at 227. Otherwise, method 200 continues at 230.

At 227, the application server makes a determination if it has sent request messages for usage data to all the power supply devices (for example, power supply devices 100 of FIG. 1). If it is determined that request messages for usage data have been sent to all power supply devices, the method 200 ends. An error message may be displayed on the application server. It is to be appreciated that other forms of error notification may be used. If it is determined that not all power supply devices receive request messages for usage data, method 200 continues at 210.

At 230, the application server identifies the usage data that matches the pattern data defined by the pattern information and the timing information of the control message.

At 235, the application server identifies a power supply device based on the identified usage data that matches the pattern data defined by the pattern information and the timing information of the control. The identification of the power supply device may be possible because the identified usage data may include an identification identifying the power supply device. Since the usage data may also include a data field identifying a port of the power supply device, the application server may further identify the port of the power supply device based on the identified usage data.

Accordingly, the application may be able to discover the power connection between the network device and the port(s) of the power supply device(s). The application server may perform the method 200 repeatedly for each network device that the application server is managing. Subsequently, a complete power connection mapping diagram between each of the network devices (for example, network devices 50 of FIG. 1) and each port of the power supply devices (for example, power supply devices 100 of FIG. 1) may be obtained. Such power mapping diagram may be stored in a database accessible by the application server. The database may be stored locally in the application server. It is to be appreciated that the databased may be stored in a network cloud that is remotely accessible to the application server. The application server may update and manage the power connection mapping database. The application server may also provide services based on the power connection mapping information. For example, the application server may be able to shut down a network device if the port of the power supply device that connects to the network device shows no or low power usage. It is to be appreciated that method 200 may be performed multiple times for a network device to identify more than one power supply devices connecting to the network device.

Figure 3A:
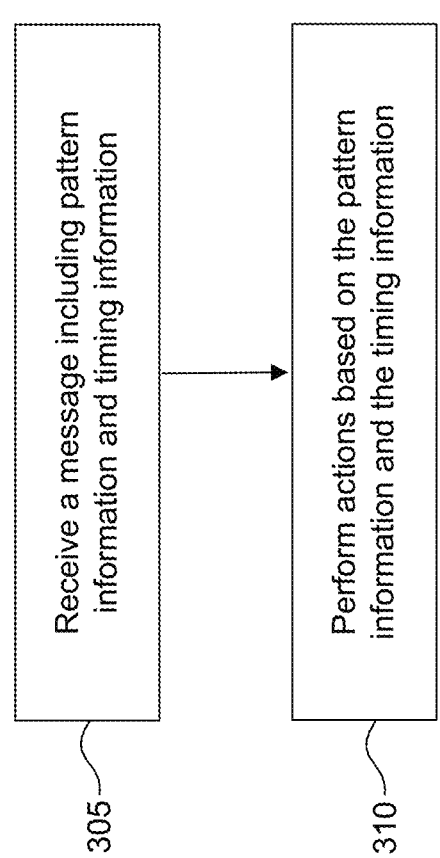
FIG. 3A illustrates an example method performed by a network device, according to some aspects of the disclosure.

FIG. 3A illustrates example method 300A, according to some aspects of the disclosure. In one example, method 300A is performed by a network device. As a convenience and not a limitation, FIG. 3A may be described with regard to elements of FIGS. 1-2.

Method 300A may represent the operation of a network device (for example, one of the network devices 50 of FIG. 1). Methods 300A may also be performed by computer system 700 of FIG. 7. Method 300A is not limited to the specific aspects depicted in those figures and other systems may be used to perform the method as will be understood by those skilled in the art. It is to be appreciated that not all operations may be needed, or additional operations may be needed, and the operations may not be performed in the same order as shown in FIG. 3A.

At 305, the network device (for example, network device 50-1 of FIG. 1) receives a control message (for example, message 23 of FIG. 1). The control message includes pattern information and timing information. The control message may also identify a component of the network device, for example, a fan of the network device. The pattern information may include a set of pattern data points, each data point may be defined by a time parameter and a fan speed value parameter. The fan speed value may be represented by the percentage of the maximum speed of the fan. It is to be appreciated that other forms of fan speed value may be used. The timing information may include a start time, a pattern duration value and a repetition value. The set of pattern data points may be within the time period defined by the start time and the pattern duration.

At 310, after receiving the control message, the network device performs actions based on the pattern information and the timing information of the control message. In one example, the network device changes the fan speed according to the pattern information and the timing information of the control message. As discussed earlier with respect to FIG. 1, the pattern information may include a set of pattern data points $P=(P_1, P_2, \ldots . P_m)$, and each pattern data point $P_i$ of the set of pattern data points represents a point on a 2-dimensional plane defined by a Time-axis and a Value-axis, for example, $P_i=(T_i, V_i)$. Here m is a positive integer number, i is an index that takes value between 1 and m, $T_i$ represents a time parameter on the Time-axis, and $V_i$ represents a fan speed value parameter on the Value-axis. The network device first reads the first pattern data point $P_i$ from the pattern information field of the control message. $P_1$ is represented by a first time parameter $T_1$ which may take value $t_1$ on the Time-axis, and a first fan speed parameter $V_1$ which may take value $v_1$ on the Value-axis. The network device adjusts the fan speed to be $v_1$ at the time instance $t_1$. The network device may keep the fan speed at $v_1$ until time $t_2$, a value taken by a second time parameter $T_2$, the second time parameter $T_2$ may be obtained from the second pattern data point $P_2$ of the pattern information. The second pattern data point also includes a second fan speed parameter $V_2$. $V_2$ may take the value $v_2$ on the Value-axis at time $t_2$. Accordingly, the network device may keep the fan speed to be the first fan speed $v_1$ from time $t_1$ to time $t_2$. The network device controls the fan speed based on $P_1, P_2, \ldots, P_m$, which are defined by the pattern information for the pattern duration as defined by the timing information. The same pattern may be repeated for R times, where R is a positive integer and it is defined in the timing information as the repetition value.

Figure 3B:
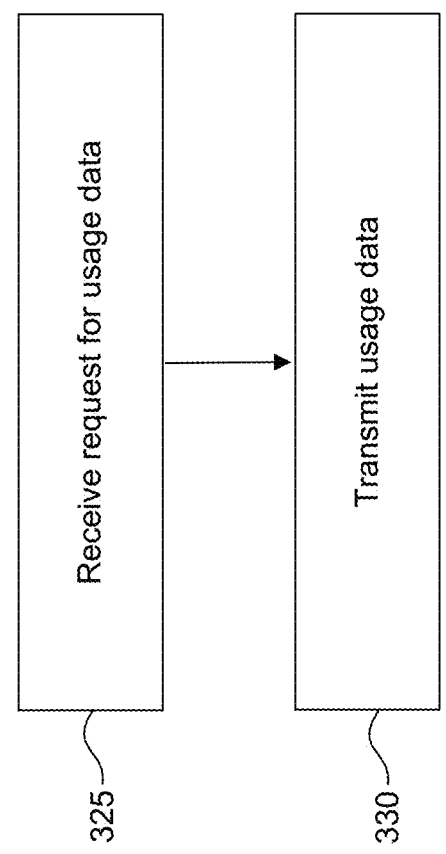
FIG. 3B illustrates an example method performed by a power supply device, according to some aspects of the disclosure.

FIG. 3B illustrates example method 300B, according to some aspects of the disclosure. In one example, method 300B is performed by a power supply device to provide usage data. As a convenience and not a limitation, FIG. 3B may be described with regard to elements of FIGS. 1, 2 and 3A.

Method 300B may represent the operation of a power supply device (for example, one of the power supply devices 100 of FIG. 1). Methods 300B may also be performed by computer system 700 of FIG. 7. Method 300B is not limited to the specific aspects depicted in those figures and other systems may be used to perform the method as will be understood by those skilled in the art. It is to be appreciated that not all operations may be needed, or additional operations may be needed, and the operations may not be performed in the same order as shown in FIG. 3B.

At 325, the power supply device (for example, power supply device 100-1 of FIG. 1) receives a request message (for example, request 11-1 of FIG. 1) requesting usage data of network devices connecting to the power supply device. The request message is sent by an application server (for example, application server 150 of FIG. 1) and the request message may include timing information based on the timing information of a control message (for example, message 21 or 23 of FIG. 1) sent from the application server to a network device (for example, network device 50-1 of FIG. 1). The timing information of the request message may including a start time and a data duration that define a time window during which the usage data are being requested. In one example, the start time value is equal to or less than the start time value defined by the timing information of the control message. The data duration value is equal to or more than the total duration of the repeating patterns defined in the timing information of the control message. The total duration of the repeating patterns defined in the timing information of the control message may be calculated by multiplying the pattern duration with the repetition value.

At 330, the power supply device transmits usage data (for example, usage data 12-1 of FIG. 1) for the time period based on the timing information of the request message. Usage data may be power consumption data. And usage data may include the timing information of the request message to indicate the time window for which the usage data is being provided. In some aspect, usage data are a set of data points representing instantaneous power consumption at discrete sample times over the data duration. Power consumption may be input/output current (Amp), power consumption (Wt), or load (%), etc. In one aspect, usage data is specific to one of the ports of the power supply device and usage data of all ports of the power supply device may be transmitted to the application server. Usage data may include a data field to identify a port of the power supply device. For a power supply device with 4 ports, two bits may be used in the data field to uniquely identify the 4 ports. Usage data may also include an identification field for identifying the power supply device that provides the usage data. The identification can be an IP address of the power supply device. It is to be appreciated that other forms of identification that can uniquely identify the power supply device may be used. It is to be appreciated that the power supply device may voluntarily transmit usage data in real time or periodically without requiring the application server to transmit the request message first.

In one aspect, the usage data include a set of data points representing instantaneous input/output current in Amp at discrete times over a period of time. In one aspect, the usage data include a set of data points representing instantaneous power consumption in Wt at discrete times over a period of time. In one aspect, the usage data include a set of data points representing instantaneous load in percentage at discrete times over a period of time. The data duration may be sampled every 1 s. It is to be appreciated that other sample period may be used to produce a set of power consumption data points.

Figure 3C:
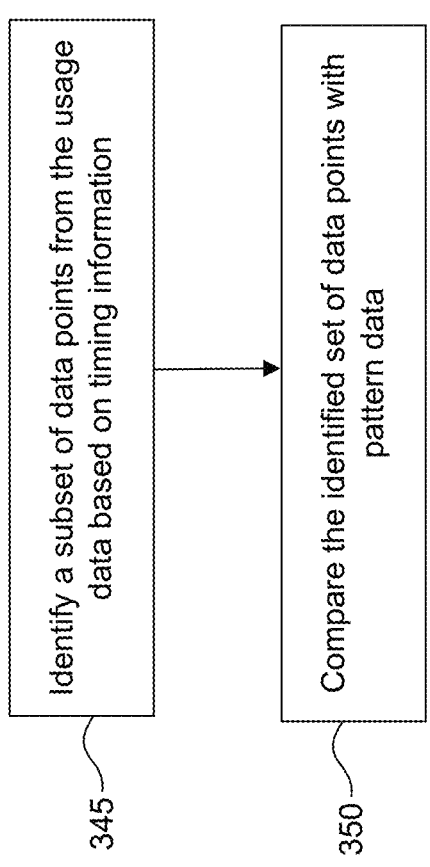
FIG. 3C illustrates an example method performed by an application server, according to some aspects of the disclosure.

FIG. 3C illustrates example method 300C, according to some aspects of the disclosure. In one example, method 300C is performed by an application server to compare usage data with the pattern information based on the timing information of a control message. As a convenience and not a limitation, FIG. 3C may be described with regard to elements of FIGS. 1, 2, 3A and 3B.

Method 300C may represent the operation of an application server (for example, application server 150 of FIG. 1). Methods 300C may also be performed by computer system 700 of FIG. 7. Method 300C is not limited to the specific aspects depicted in those figures and other systems may be used to perform the method as will be understood by those skilled in the art. It is to be appreciated that not all operations may be needed, or additional operations may be needed, and the operations may not be performed in the same order as shown in FIG. 3C.

In some aspects, the application server compares each of the usage data with the pattern data based on the pattern information and the timing information as illustrated by diagram 220 of FIG. 2. According to some aspects, at 345, the application server identifies a subset of usage data points from the usage data based on the pattern information and the timing information of the control message (for example, message 21, or 23 of FIG. 1). In one example, the subset of usage data points $SD=(SD_1, SD_2, \ldots SD_m)$ are extracted from the usage data, and each data point $SD_i$ of the subset of usage data points represents a point on a 2-dimensional plane defined by a Time-axis and a Value-axis, for example, $SD_i=(TS_i, SU_i)$, $TS_i$ represents a time parameter on the Time-axis, and may take a value $ts_i$, and $SU_i$ represents a value parameter on the Value-axis and may take a value $su_i$. As discussed earlier with respect to FIGS. 1 and 3A, the pattern information may include a set of pattern data points $P=(P_1, P_2, \ldots P_m)$, and each pattern data point $P_i=(T_i, V_i)$ of the set of pattern data points may take a pair of values $(t_i, V_i)$ that represent a fan speed $v_i$ at time $t_i$. Here m is a positive integer number, i is an index that takes value between 1 and m. The subset of usage data points SD are extracted at the same point of time as the pattern data points P, e.g., at time $t_1, t_2, \ldots, t_m$ on the Time-axis, so that the subset of usage data points SD and pattern data points P are aligned in time. As discussed earlier with respect to FIG. 3B, the usage data may be a set of usage data points at discrete sample points over a period of time (e.g., data duration). The extracted subset of usage data points D may be a subset of usage data points. It is to be appreciated that the extracted usage data points SD may be obtained by interpolating the usage data points. The pattern data may define a pattern for a pattern duration T and the pattern data may be repeated R times. The pattern duration T and the repetition value R may be defined in the timing information of the control message. Accordingly, total R subsets of usage data points SD may be extracted from the usage data. For example, a second subset of usage data points SD may be extracted from the usage data at times $T+t_1$, $T+t_2$, . . . , $T+t_m$ on the Time-axis, and the Rth subset of data points D may be extracted from the usage data at times $(R-1)*T+t_1$, $(R-1)*T+t_2$, . . . , $(R-1)*T+t_m$ on the Time-axis.

At 350, the extracted subsets of usage data points are compared with the pattern data points for each pattern period T. A match may be found if the values of the extracted subsets of usage data points are similar to the values of the pattern data points. It is to be appreciated that there are multiple ways to compare the usage data and the pattern data. In one aspect, both the usage data values and the pattern data values are normalized before comparison. In one aspect, two graphs are drawn based on the extracted usage data points and the pattern data points on a 2-dimensional plane defined by a Time-axis and a Value-axis, and compare the similarity of the two graphs. Two graphs may be considered similar if they are approximately proportional to each other, and having similar shapes even if they may be differ in scale. It is to be appreciated that different ways of defining similarity of two graphs can be used in the comparison.

Figure 4:
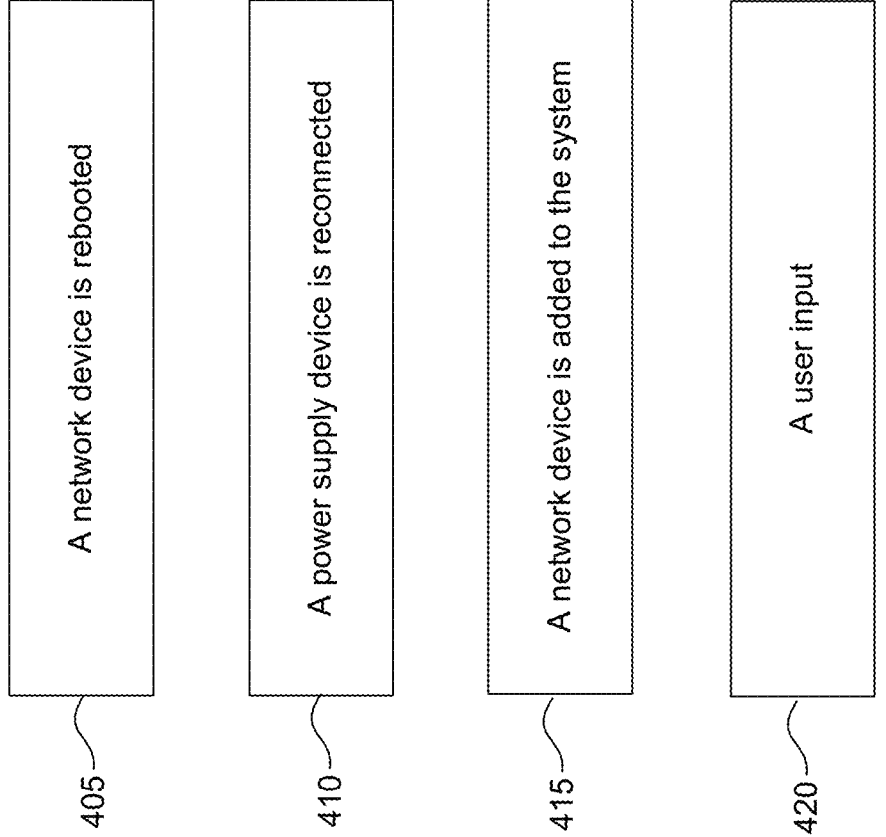
FIG. 4 illustrates example triggering events for triggering the method of discovering power connections to be performed, according to some aspects of the disclosure.

FIG. 4 illustrates a block diagram of process 400, according to some aspects of the disclosure. In one example, process 400 can be performed by an application server (for example, application server 150 of FIG. 1). As a convenience and not a limitation, FIG. 4 may be described with regard to elements of FIGS. 1-3C. It is to be appreciated that not all operations may be needed, or additional operations may be needed, and the operations may not be performed in the same order as shown in FIG. 4.

In some aspects, a set of triggering events may cause the application server to perform the method as illustrated in FIG. 2. According to some aspect, referring to 405, a network device (for example, one of the network devices 50 of FIG. 1) may be rebooted, the application server may want to double check the power connections of the network device by sending a control message (for example, message 21, 23 of the FIG. 1) to the network device to perform the method as illustrated in FIG. 2.

According to some aspect, referring to 410, one or more power supply devices (for example, one or more power supply devices 100 of FIG. 1) may reconnect to network devices after a power disruption. This may trigger the application server to perform the method as illustrated in FIG. 2 to update or maintain the power connection diagram in the database.

According to some aspect, referring to 415, a new network device (for example, one of the network devices 50 of FIG. 1) may be added to the system, the application server may want to update the power connection diagram in the database with the new network device by sending a control message (for example, message 21, 23 of the FIG. 1) to the newly added network device and perform the method as illustrated in FIG. 2.

According to some aspect, referring to 420, at any time, a user input may trigger the application server to send a control message to one or more network devices to perform the method as illustrated in FIG. 2. The application sever may have a management software and the management software may have a user interface (UI) to take user inputs. The user may select one or more network devices from the UI, select a pattern from a list of predefined patterns and cause the application server to send a control message to the selected one or more network devices. It is to be appreciated that the UI may allow the user to define a new pattern. The user may also configure the system to update and manage the power connection diagram periodically, for example, once every month.

Figures 5A, 5B:
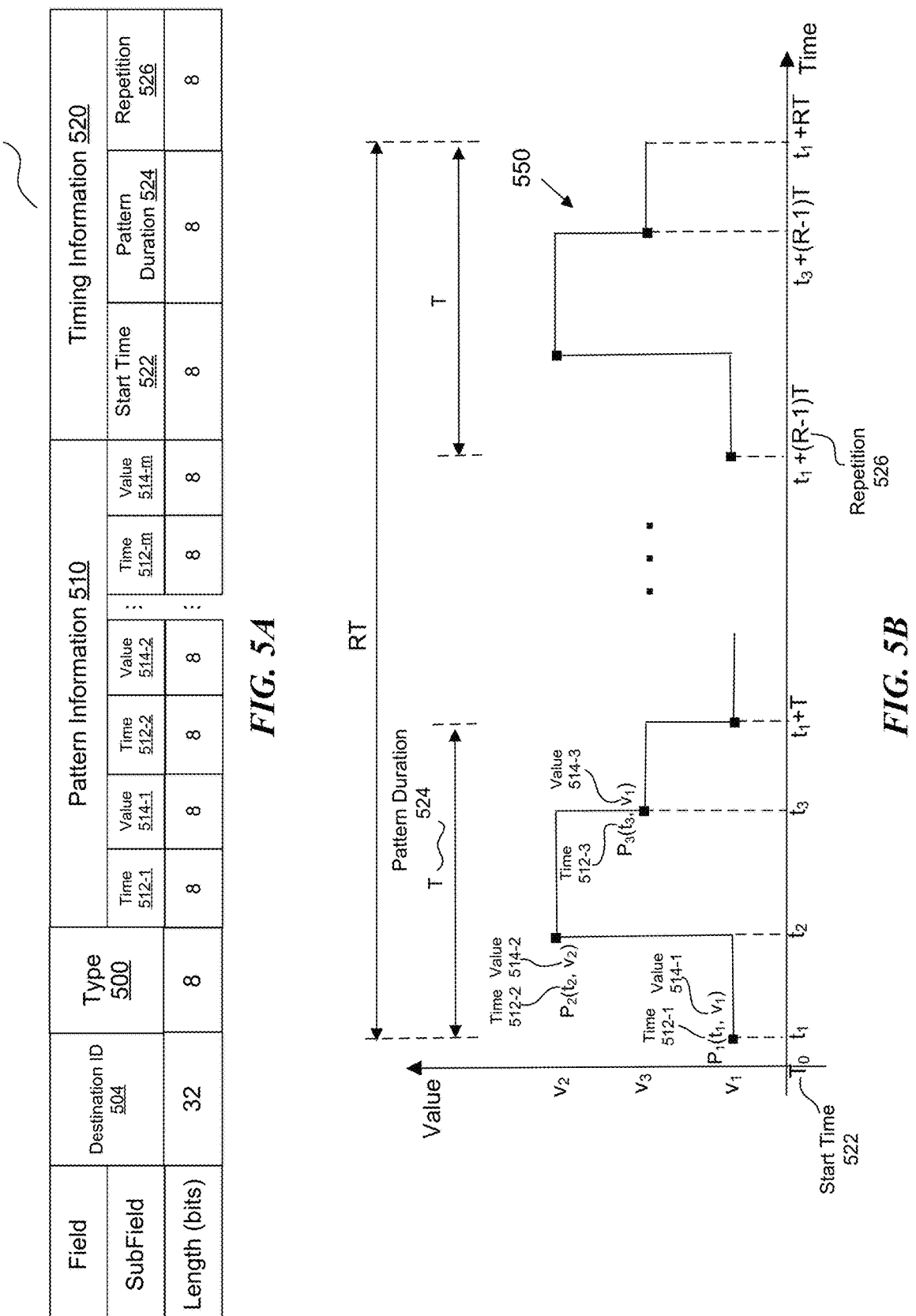
FIG. 5A illustrates an example data structure of a message received by a network device, according to some aspects of the disclosure.
FIG. 5B illustrates an example graphical representation of pattern data based on the pattern information and timing information of a message received by a network device, according to some aspects of the disclosure.

FIG. 5A illustrates an example data structure of a control message 501 transmitted by an application server to a network device, according to some aspects of the disclosure. As a convenience and not a limitation, FIG. 5A may be described with regard to elements of FIGS. 1-4. For example, control message 501 may be message 21 of FIG. 1 or message 23 of FIG. 1, transmitted by application server 150 of FIG. 1 to one or more of the network devices 50 of FIG. 1. The control message may cause the network device to consume power according to a pattern. It is to be appreciated that there are many ways to design the data structure to represent pattern data and the fields of the data structure can vary depending on various factors.

According to some aspect, control message 501 includes Destination ID field 504 and Type field 500. Destination ID field 504 identifies a target network device control message 501 is sending to. Destination ID field 504 may be an IP address of the network device. It is to be appreciated that other forms of identification that can uniquely identify the network device may be used. Type field 500 may be an 8-bit field and can be used to identify a type of component or activity of the network device to be controlled according to control message 501. As an example, the Type field 500 indicates a fan of the network device. Control massage 501 also includes Pattern Information field 510 and Timing Information field 520. In one aspect, Pattern Information field 510 includes Time fields 512-1, 512-2, . . . , 512-m and Value fields 514-1, 514-2, . . . , 514-m. Pattern Information field 510 defines a set of pattern data points $P=(P_1, P_2, . . . . P_m)$, and each data point $P_i=(T_i, V_i)$ of the set of pattern data points P represents a point on a 2-dimensional plane defined by a Time-axis and a Value-axis. Time fields 512-1, . . . , 512-m represent time parameters $T_1$, $T_2$, . . . , $T_m$ on the Time-axis, and Value fields 514-1, 514-2, . . . , 514-m represent Value parameters $V_1$, $V_2$, . . . , $V_m$ on the Value-axis. Here m is a positive integer number, i is an index that takes value between 1 and m. In one aspect, Timing Information field 520 includes Start Time field 522, Pattern Duration field 524 and Repetition field 526. Start Time field defines the starting time of the pattern defined by Pattern Information field 510, Pattern Duration field 524 defines the duration for the pattern defined by Pattern Information field 510, and Repetition field 526 defines how many time the pattern defined by Pattern Information field 510 is repeated.

From here on, Time fields 512-1, . . . , 512-m are either referred to as a group as Time 512 or individually as Time 512-1, 512-2, . . . , 512-m. Value fields 514-1, 514-2, . . . , 514-m are referred to either as a group as Value 514 or individually as Value 514-1, 514-2, . . . , 514-m. In one aspect, Time 512 indicate absolute time values on the Time-axis. It is to be appreciated that other form of Time 512 may be used. For example, Time 512 may indicate offsets to the Start Time 522. Time 512-1=0 indicates the time $T_1$ for the first pattern data point $P_1$ on the Time-axis is the same as Start Time 522. Similarly, $T_i$=Time 512-i+Start Time 522 for i between 1 and m. It is to be appreciated that other data fields may be added to control message 501. While FIG. 5A illustrates that 32 or 8 bits are used for each field, it is to be appreciated that different number of bits may be used for each field of control message 501.

FIG. 5B illustrates an example pattern data graphically represented by a pattern data graph 550 on a 2-dimensional plane defined by a Time-axis and a Value-axis, according to some aspects of the disclosure. As a convenience and not a limitation, FIG. 5B may be described with regard to elements of FIGS. 1-5A. For example, the pattern data may be defined by Pattern Information 510 and Timing Information 520 of control message 501 of FIG. 5A. The pattern data may be defined by message 21, or message 23 of FIG. 1. The pattern data may cause one of the network devices 50 of FIG. 1 to change the speed of its fan accordingly.

According to some aspect, pattern data graph 550 is based on three pattern data points $P=(P_1, P_2, P_3)$ on the 2-dimensional plane defined by the Time-axis and the Value-axis. Each pattern data point $P_i=(T_i, V_i)$ is defined by a time parameter $T_i$ and a value parameter $V_i$. Here i is an integer and takes value of 1, 2, or 3. Time parameters $T_1$, $T_2$, and $T_3$ are defined by Time 512-1, Time 512-2, and Time 512-3 of control message 501 of FIG. 5A. Value parameters $V_1$, $V_2$, and $V_3$ are defined by Value 514-1, Value 514-2, and Value 514-3 of control message 501 of FIG. 5A. In one aspect, the Value-axis represents a fan speed of a network device (for example, one of the network devices 50 of FIG. 1). In the example, as illustrated in FIG. 5B, the time parameters take values of $t_1$, $t_2$, and $t_3$, and the value parameters take values of $v_1$, $v_2$, and $v_3$. The first pattern data point $P_i$ indicates that the fan speed of the network device is set to be $v_1$ at time $t_1$, and the fan speed is kept to be $v_1$ until time $t_2$, when pattern data point $P_2$ indicates that the fan speed is set to $v_2$ at time $t_2$. Similarly, the fan speed is kept to be $v_2$ until time $t_3$, when pattern data point $P_3$ indicates that the fan speed is set to $v_3$ at time $t_3$. The fan speed is kept at $v_3$ until the end of the pattern duration T. Accordingly, the pattern data points $P_1$, $P_2$, and $P_3$ define the fan speed pattern for pattern duration T. The same pattern may be repeated in every subsequent pattern duration T and for R times. In one aspect, T is defined by Duration field 524 of control message 501 of FIG. 5A, and R is defined by Repetition field 526 of control message 501 of FIG. 5A.

In one aspect, the pattern data starts at $T_0$, a start time defined by the Start Time field 522 of control message 501 of FIG. 5A. As illustrated in the example pattern data in FIG. 5B, the first pattern data point $P_1$ starts at $t_1$, which is different from $T_0$, and the total duration of the repeating pattern data is $RT+t_1-T_0$. It is to be appreciated that $t_1$ may be equal to $T_0$, in this case, the total duration of the repeating pattern data is RT. Pattern data as represented by pattern data graph 550 may be one of a list of predefined pattern data in the application server (for example, application server 150 of FIG. 1) for a user to select from. Pattern data as represented by pattern data graph 550 may also be configured by a user manually. It is to be appreciated that FIG. 5B only illustrates one example of pattern data based on the patterning information and the timing information of control message 501, other pattern data may be used.

Figures 6A, 6B:
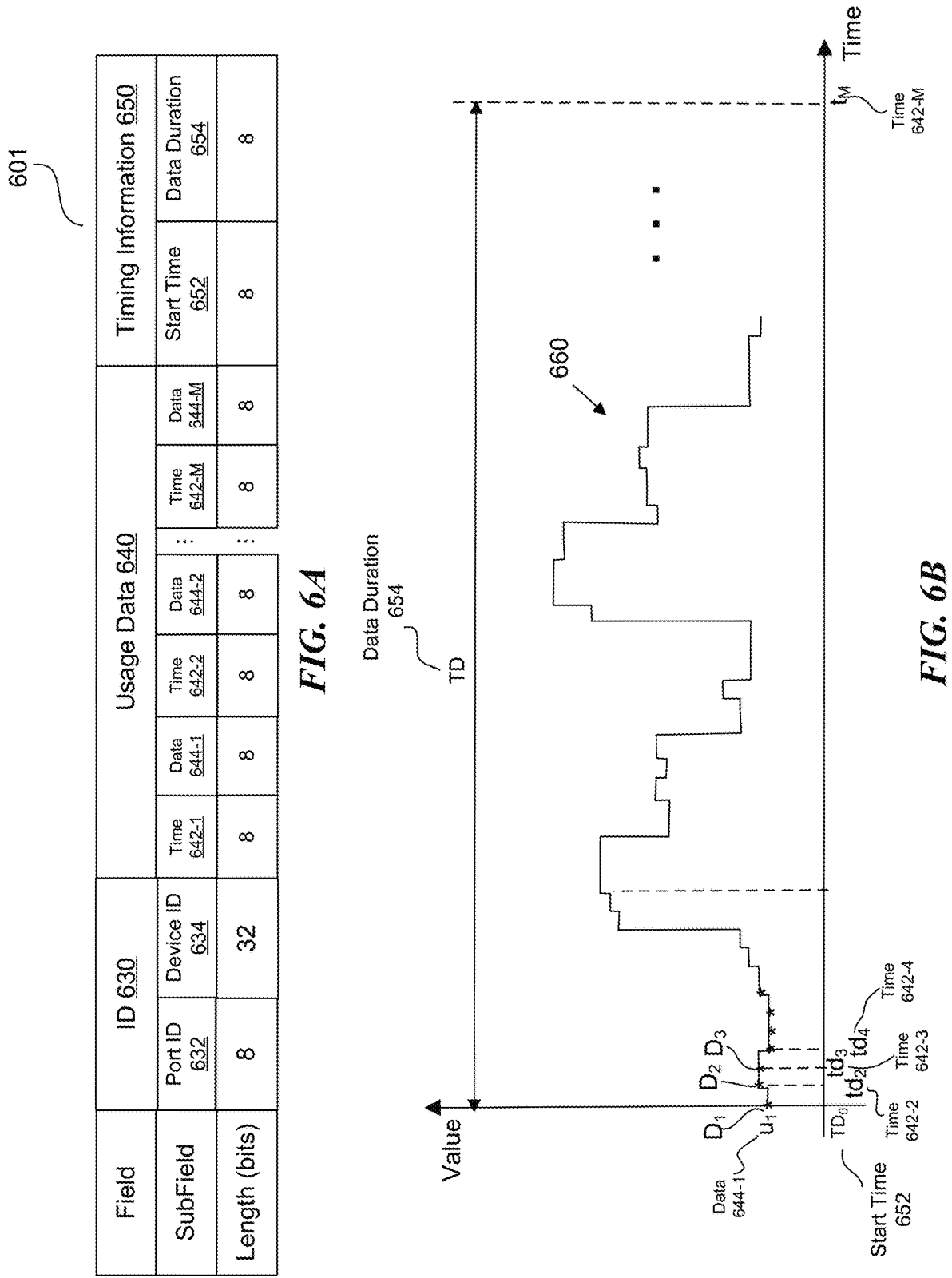
FIG. 6A illustrates an example data structure of a usage data message transmitted by a power supply device, according to some aspects of the disclosure.
FIG. 6B illustrates an example graphical representation of power usage data based on usage data message, according to some aspects of the disclosure.

FIG. 6A illustrates an example data structure of usage data message 601 transmitted by a power supply device to an application server, according to some aspects of the disclosure. As a convenience and not a limitation, FIG. 6A may be described with regard to elements of FIGS. 1-5B. For example, usage data message 601 may be usage data 12 of FIG. 1, or usage data 10 of FIG. 1, transmitted by one or more of the power supply devices 100 of FIG. 1 to application server 150 of FIG. 1. It is to be appreciated that there are many ways to design the data structure to represent usage data and the fields of the data structure can vary depending on various factors.

According to some aspect, usage data message 601 includes ID field 630. ID field 630 may include Port ID field 632 and Device ID field 634. Port field 630 identifies the port of the power supply device the usage data corresponding to. Device ID field 634 identifies the power supply device that provides the usage data. Device ID field 634 may be an IP address of the power supply device. It is to be appreciated that other forms of identification that can uniquely identify the power supply device may be used. In one aspect, Usage data message 601 includes Usage Data field 640 and Timing Information 650. In one aspect, Usage Data field 640 includes Time fields 642-1, 642-2, . . . , 642-M and Data fields 644-1, 644-2, . . . , 644-M. Here M is a positive integer. Usage Data field 640 defines a set of usage data points on a 2-dimensional plane defined by a Time-axis and a Value-axis. Time fields 642-1, 642-2, . . . , 642-M represent time parameters on the Time-axis, and Data fields 644-1, 514-2, . . . , 644-M represent Value parameters on the Value-axis. Each Data 644-i corresponds to the usage data value on the Value-axis at Time 642-i on the Time-axis, for i between 1 and M.

In one aspect, Timing Information field 650 includes Start Time field 652 and Data Duration field 654 that define a time window. And only the usage data of the defined time window are being provided. As an example, Start Time field defines the starting time of the usage data, and Data Duration 644 defines the duration of the usage data. Timing Information 650 of usage data message 601 may be based on a request message, for example, requests 11 of FIG. 1, which may be further base on the timing information of a control message, for example, message 21, 23 of FIG. 1, or control message 501 of FIG. 5A. Accordingly, value of Start Time 652 may be less than or equal to Start Time 522 of control message 501, and Data Duration 654 may take a value that is equal to or greater than the total duration of repeating pattern data as defined by control message 501.

From here on, Time fields 642-1, 642-3, . . . , 642-M are either referred to as a group as Time 642 or individually as Time 642-1, 642-2, . . . , 642-M. Similarly, Data fields 644-1, 644-2, . . . , 644-M are referred to either as a group as Data 644 or individually as Data 644-1, 644-2, . . . , 644-M. Time 642 may indicate evenly sampled time value at the Time-axis starting from Start Time 652 for the Data Duration 654. In one aspect, Time 642 indicate absolute time values on the Time-axis. It is to be appreciated that other forms of Time 642 may be used. As an example, Time 642 may indicate offsets to Start Time 642. In this case, Data 644-i takes usage data value at $T_i$=Time 642-i+Start Time 652 on the Time axis for i between 1 and M. While FIG. 6A illustrates that 32 or 8 bits are used for each field, it is to be appreciated that different number of bits may be used for each field of usage data message 601. It is to be appreciated that the data structure of usage data message 601 as illustrated in FIG. 6A is one example format, other data structure may be used for representing usage data. As an example, Time 642 may be removed and replaced with a data field indicating sampling period for each usage data.

FIG. 6B illustrates an example of usage data graphically represented by a usage data graph 660 on a 2-dimensional plane defined by a Time-axis and a Value-axis, according to some aspects of the disclosure. As a convenience and not a limitation, FIG. 6B may be described with regard to elements of FIGS. 1-6A. For example, the usage data may represent power consumption data of a network device (for example, one of the network devices 50 of FIG. 1) connecting to a port of a power supply device (for example, one of the power supply devices 100 of FIG. 1). The usage data may be defined by usage data message 601 of FIG. 6A. The usage data may be defined by usage data 12, or 10 of FIG. 1.

According to some aspect, usage data includes a set of usage data points D=(D$_1$, D$_2$, . . . , D$_M$) on the 2-dimensional plane defined by the Time-axis and the Value-axis. Each usage data point D$_i$=(TD$_i$, U$_i$) is defined by a time parameter TD$_i$ and a value parameter U$_i$. Here M is a positive integer, i is an integer and takes value between 1, and M. Time parameters TD$_1$, TD$_2$, . . . , TD$_M$ may be defined by Time 642-1, Time 642-2, . . . , Time 642-M of usage data message 601 of FIG. 6A. Value parameters U$_1$, U$_2$, . . . , U$_M$ may be defined by Data 644-1, Data 644-2, . . . , Data 644-M of usage data message 601 of FIG. 6A. The Value-axis may represent power consumption of a network device (for example, network device 50-1 of FIG. 1) connecting to a port of a power supply device (for example, port a of power supply device 100-1 of FIG. 1). In one aspect, the power consumption may be represented by one of input/output current in Amp, power consumption in Wt, or load in percentage. It is to be appreciated that other forms of data may be used as power consumption data.

In one aspect, the time parameters of the set of usage data points D take values of td$_1$, td$_2$, . . . , td$_M$, which may be evenly distributed sample points on the Time-axis within the data duration TD starting from TD$_0$. TD is the duration of the usage data, which is defined by Data Duration 654 of usage data message 601 of FIG. 6A. TD$_0$ is the starting time of the usage data, which is defined by Start Time 652 of usage data message 601 of FIG. 6A. In the example illustrated in FIG. 6B, the time value td$_1$ for the first data point D$_1$ equals the starting time TD$_0$. The value of each usage data point D$_i$ indicates the power consumption value at time td$_i$. The power consumption data graph 660 in FIG. 6B is based on the set of usage data points D and illustrates an approximation of real-time power consumption of the network device over the time duration TD. The follow process may be used to draw the power consumption data graph 660 based on the set of usage data D. The first usage data point D1 represents a power consumption of u$_1$ at time td$_1$ (e.g., TD$_0$). The power consumption value stays at u$_1$ until the next sample time td$_2$, and the second data point D$_2$ indicates the power consumption is u$_2$ at time td$_2$. The power consumption value stays at u$_2$ until time td$_3$. This process continues until all the usage data points are used and the power usage graph may be obtained. As discussed earlier with respect to FIG. 6A, data duration TD may be greater than or equal to the total time of repeating pattern data. As an example, the total time of repeating pattern data is t$_1$+RT as illustrated in FIG. 5B. Accordingly, TD may be >=t$_1$+RT.

Figure 6C:
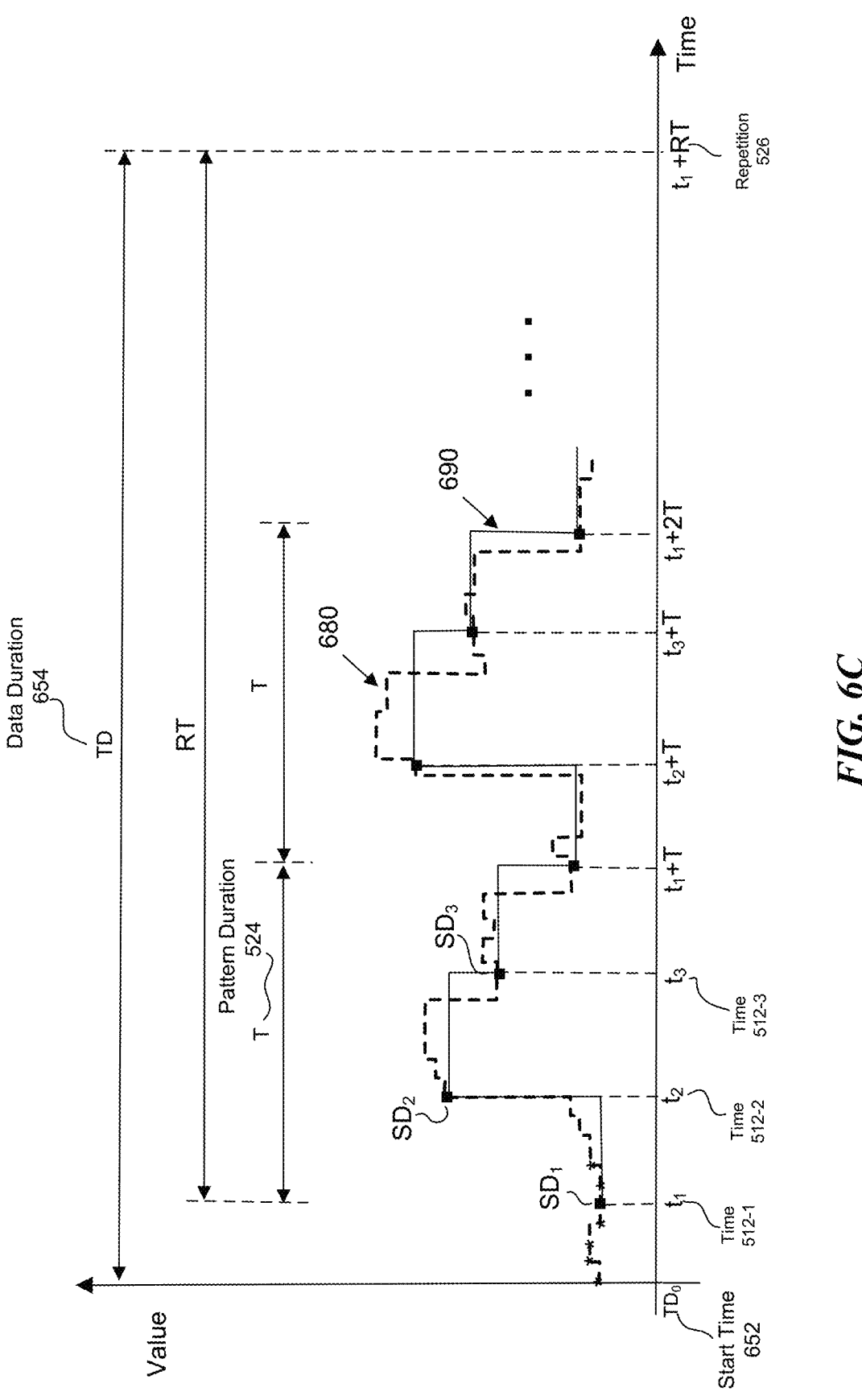
FIG. 6C illustrates an example graphical representation of extracting a subset of power usage data points for comparing to pattern data, according to some aspects of the disclosure.

FIG. 6C illustrates an example of extracting a subset usage data points from usage data to compare with pattern data, according to some aspects of the disclosure. As a convenience and not a limitation, FIG. 6C may be described with regard to elements of FIGS. 1-6B. An application server (for example, application server 150 of FIG. 1) may perform the extraction and comparison. The usage data may be provided by a power supply device and represent power consumption data of a port of the power supply device (for example, one of the power supply devices 100 of FIG. 1). The port connects to a network device (for example, one of the network devices 50 of FIG. 1). The usage data may be defined by usage data message 601 of FIG. 6A, or usage data 12, 10 of FIG. 1. The usage data may be represented by usage data graph 660 of FIG. 6B on a 2-dimensional plane defined by a Time-axis and a Value-axis. The pattern data may be defined by Pattern Information 510 and Timing information 520 of control message 501 of FIG. 5A. Additionally, pattern data may be defined by message 21 or 23 of FIG. 1.

According to some aspects, the application server sends a control message (for example, message 21, 23) to a network device (for example, network device 50-1 of FIG. 1). Subsequently, the application server sends a request for usage data (for example, request 11-1 of FIG. 1) to a power supply device (for example, power supply device 100-1 of FIG. 1). Accordingly, the power supply device sends usage data (for example, usage data 12-1 of FIG. 1) of one of its ports (for example, port a of power supply device 100-1) of FIG. 1 back to the application server. According to some aspects, the request for usage data can be optional. For example, the power supply device may send usage data to the application server without the application server sending the request for usage data.

In one aspect, the application server produces a graphical representation usage data graph 680 of the received usage data (for example, usage data 10 of FIG. 1) based on a set of usage data points D=(D$_1$, D$_2$, . . . , D$_M$) included in the usage data. The set of usage data points are on the 2-dimensional plane defined by the Time-axis and the Value-axis. Here M is a positive integer and represents the total number of usage data points. As discussed earlier with respect to FIGS. 3C, 6A and 6B, each usage data point D$_i$=(TD$_i$, U$_i$), where TD$_i$ represents a time parameter and may take a value td$_i$ on the Time-axis and U$_i$ represents a value parameter and may take a value u$_i$ on the Value-axis. Time value td$_1$, td$_2$, . . . , td$_M$ are defined by Time 642 of usage data message 601 of FIG. 6A. Data value u$_1$, u$_2$, . . . , u$_M$ are defined by Data 644 of usage data message 601 of FIG. 6A. Usage data graph 680 may be obtained based on usage data points D by the same process as described with respect to FIG. 6B. Usage data graph 680 has a duration of TD, which may be defined by Data Duration 654 of usage data message 601 of FIG. 6A.

In one aspect, the application server extracts a subset of usage data points SD=(SD$_1$, SD$_2$, . . . . SD$_m$) from the usage data points D. Here SD$_i$=(TS$_i$, SU$_i$), TS$_i$ represents a time parameter on the Time-axis, and may take a value ts$_i$, and SU$_i$ represents a value parameter on the Value-axis and may take a value su$_i$. As discussed earlier with respect to FIG. 3A, the control message may define a set of pattern data points P=(P$_1$, P$_2$, . . . . P$_m$) with P$_i$=(T$_i$, V$_i$). Here m is a positive integer number representing the total number pattern data points, i is an index that takes value between 1 and m. T$_i$ represents a time parameter on the Time-axis and takes value t$_i$ that is defined by Time 512-i of control message 501 of FIG. 5A. V$_i$ may represent a fan speed value parameter on the Value-axis and is defined by Value 514-i of control message 501 of FIG. 5A. To compare usage data with pattern data, in one example, the application server aligns the subset of usage data points SD with pattern data points P by extracting SD based on time values of P, i.e., su$_i$=t$_i$. And usage data value SD$_i$ at time t$_i$ may be obtained by interpolating usage data points D. It is to be appreciated that there are other ways to obtain usage data value SD$_i$ at time t$_i$. As an example, SD$_i$ at time t$_i$ may take an average value of several usage data points D$_i$.

In one aspect, a different subset of usage data points SD are extracted for every pattern duration time. The pattern duration time T may be defined by Pattern Duration 524 of control message 501 of FIG. 5A. The total number of subsets of usage data points SD may be R, where R is the value of how many times the pattern data repeats, and R may be defined by Repetition 526 of control message 501 of FIG. 5A.

It is to be appreciated that all devices in a networked system (for example, system 101 of FIG. 1) can be time synchronized so that aligning time for usage data from the power supply device and pattern data from the application server is possible. FIG. 6C shows an example of m=3. Once the R subsets of usage data SD are obtained, each subset of usage data SD may be compared with pattern data by application server. While FIG. 6C shows an example of how to compare usage data with pattern data, it is to be appreciated that it is not required for the application server to produce a usage data graph and/or a pattern data graph as disclosed for comparison. For example, the application server can compare usage data with the pattern data without using their graphical representations.

Figure 7:
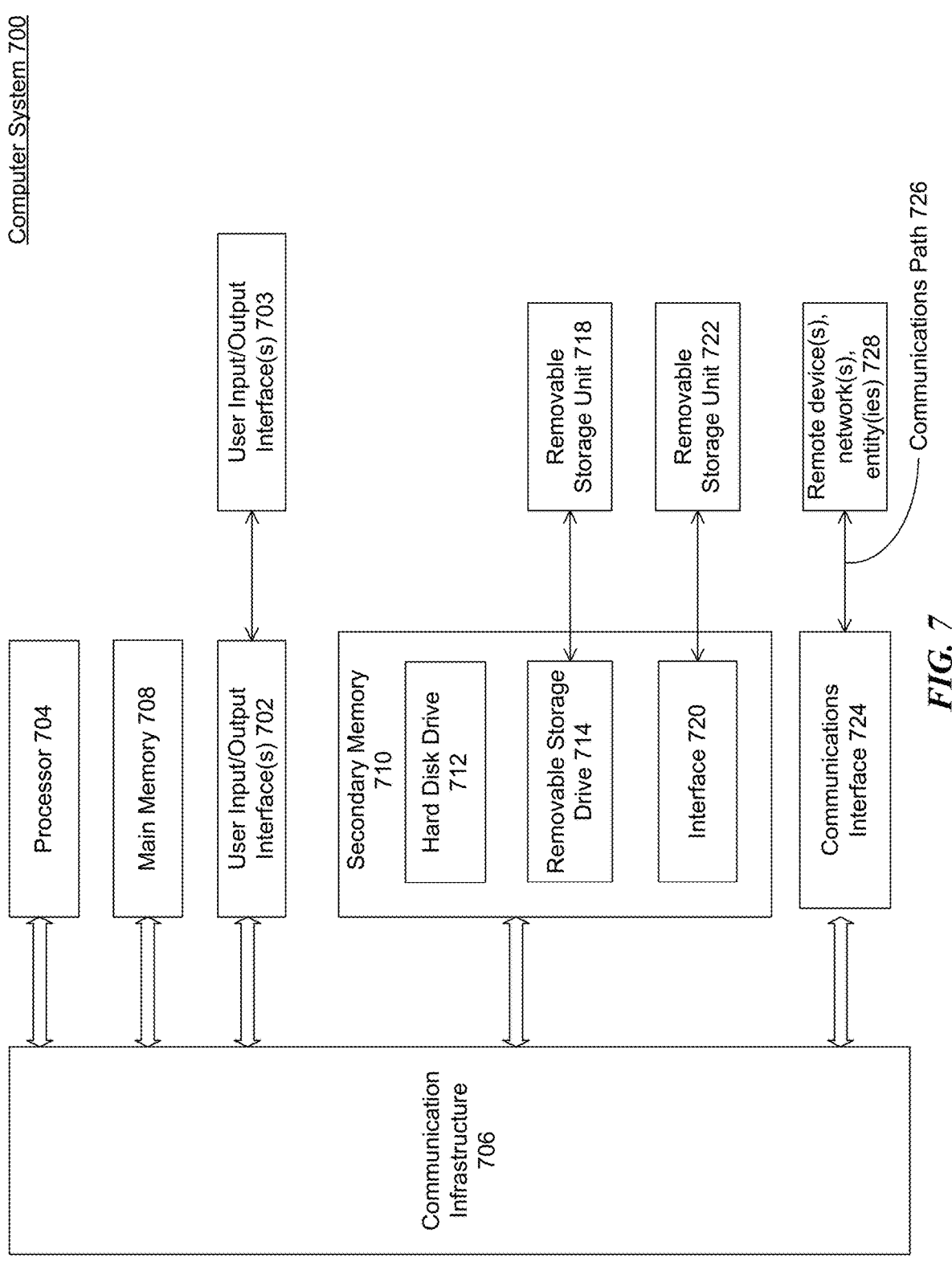
FIG. 7 illustrates an example computer system for implementing some aspects of the disclosure or portion(s) thereof.

Various aspects can be implemented, for example, using one or more computer systems, such as computer system 700 shown in FIG. 7. Computer system 700 can be any well-known computer capable of performing the functions described herein such as power supply devices 100, network devices 50, and application server 150 of FIG. 1. I. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

According to some aspects, secondary memory 710 may include other means, devices, components, instrumentalities, or other approaches for allowing computer programs and/or other instructions and/or data to be accessed by computer system 700. Such means, devices, components, instrumentalities, or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

What is claimed is:

1. A computer-implemented method of automatically identifying network device to power supply device connections, comprising:

transmitting a first message to a first network device, wherein the first message comprises pattern information and first timing information;

causing the first network device to consume power according to the pattern information and the first timing information of the first message;

transmitting a second message to one or more power supply devices, wherein the second message comprises second timing information based on the first timing information;

receiving, from the one or more power supply devices, a plurality of usage data, wherein the plurality of usage data is collected based on the second timing information and wherein each of the plurality of usage data corresponds to a network device;

comparing the plurality of usage data with pattern data defined by the pattern information and the first timing information;

identifying one of the plurality of usage data that matches the pattern data; and identifying a power supply device of the one or more power supply devices connecting to the first network device based on the identification of the usage data that matches the pattern data.

2. The computer-implemented method of claim 1, further comprising detecting a triggering event, wherein the triggering event is at least one of a network device having been rebooted, a power supply device reconnecting to a network device, a new network device being added, or a user input.

3. The computer-implemented method of claim 1, wherein the pattern information comprises a pattern of fan speed values of a fan of the first network device.

4. The computer-implemented method of claim 1, wherein the first timing information comprises a start time and a duration of time.

5. The computer-implemented method of claim 1, wherein comparing the plurality of usage data is based on the first timing information.

6. The computer-implemented method of claim 1, wherein each of the plurality of usage data comprises values of at least one of current, power, or load associated with a corresponding port of one of the one or more power supply devices.

7. The computer-implemented method of claim 1, wherein each of the plurality of usage data comprises an identification identifying a respective power supply device of the one or more power supply devices.

8. A non-transitory computer-readable medium having instructions stored thereon that, when executed by at least one processor, cause the at least one processor to perform operations comprising:

transmitting a first message to a first network device, wherein the first message comprises pattern information and first timing information;

causing the first network device to consume power according to the pattern information and the first timing information of the first message;

transmitting a second message to one or more power supply devices, wherein the second message comprises second timing information based on the first timing information;

receiving, from the one or more power supply devices, a plurality of usage data, wherein the plurality of usage data is collected based on the second timing information and wherein each of the plurality of usage data corresponds to a network device;

comparing the plurality of usage data with pattern data defined by the pattern information and the first timing information;

identifying one of the plurality of usage data that matches the pattern data; and identifying a power supply device of the one or more power supply devices connecting to the first network device based on the identification of the usage data that matches the pattern data.

9. The non-transitory computer-readable medium of claim 8, the operations further comprising detecting a triggering event, wherein the triggering event is at least one of a network device having been rebooted, a power supply device reconnecting to a network device, a new network device being added, or a user input.

10. The non-transitory computer-readable medium of claim 8, wherein the pattern information comprises a pattern of fan speed values of a fan of the first network device.

11. The non-transitory computer-readable medium of claim 8, wherein the first timing information comprises a start time and a duration of time.

12. The non-transitory computer-readable medium of claim 8, wherein comparing the plurality of usage data with the pattern data is based on the first timing information.

13. The non-transitory computer-readable medium of claim 8, wherein each of the plurality of usage data comprises values of at least one of current, power, or load associated with a corresponding port of one of the one or more power supply devices.

14. The non-transitory computer-readable medium of claim 8, wherein each of the plurality of usage data comprises an identification identifying a respective power supply device of the one or more power supply devices.

15. A system for automatically identifying network device to power supply device connections, comprising:

a memory; and a processor coupled to the memory and configured to perform operations comprising:

transmitting a first message to a first network device, wherein the first message comprises pattern information and first timing information, and wherein the message causes the first network device to consume power according to the pattern information and the timing information;

causing the first network device to consume power according to the pattern information and the first timing information of the first message;

transmitting a second message to one or more power supply devices, wherein the second message comprises second timing information based on the first timing information;

receiving, from the one or more power supply devices, a plurality of usage data, wherein the plurality of usage data is collected based on the second timing information and wherein each of the plurality of usage data corresponds to a network device;

comparing the plurality of usage data with pattern data defined by the pattern information and the first timing information;

identifying one of the plurality of usage data that matches the pattern data; and identifying a power supply device of the one or more power supply devices connecting to the first network device based on the identification of the usage data that matches the pattern data.

16. The system of claim 15, wherein the operations further comprise detecting a triggering event, wherein the triggering event is at least one of a network device having been rebooted, a power supply device reconnecting to a network device, a new network device being added, or a user input.

17. The system of claim 15, wherein the pattern information comprises a pattern of fan speed values of a fan of the first network device.

18. The system of claim 15, wherein the first timing information comprises a start time and a duration of time.

19. The system of claim 15, wherein comparing the plurality of usage data with the pattern data is based on the first timing information.

20. The system of claim 15, wherein each of the plurality of usage data comprises values of at least one of current, power, or load associated with a corresponding port of one of the one or more power supply devices.

* * * * *